US008606030B2

(12) United States Patent
Ning

(10) Patent No.: US 8,606,030 B2
(45) Date of Patent: Dec. 10, 2013

(54) IMAGE CORRECTION DEVICE AND METHOD

(75) Inventor: Wen-Min Ning, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 563 days.

(21) Appl. No.: 12/967,050

(22) Filed: Dec. 14, 2010

(65) Prior Publication Data

US 2012/0002058 A1    Jan. 5, 2012

(30) Foreign Application Priority Data

Jul. 5, 2010    (TW) ................................ 99121953 A

(51) Int. Cl.
*G06K 9/40*    (2006.01)
(52) U.S. Cl.
USPC ........................... 382/254; 348/187; 348/188
(58) Field of Classification Search
USPC ....................................................... 382/254
See application file for complete search history.

(56) References Cited

U.S. PATENT DOCUMENTS

| 5,883,982 | A   | * | 3/1999 | Riley et al. ..................... 382/255 |
| 7,184,173 | B2  | * | 2/2007 | Chu et al. ........................ 358/1.9 |
| 7,405,816 | B2  | * | 7/2008 | Ojanen .......................... 356/124 |
| 2012/0076405 | A1 | * | 3/2012 | Brunner et al. ............... 382/167 |

* cited by examiner

*Primary Examiner* — Samir Ahmed
*Assistant Examiner* — Totam Le
(74) *Attorney, Agent, or Firm* — Altis Law Group, Inc.

(57) ABSTRACT

An image correction device includes a test chart, an image capturing module, an image separating module, a processing module, a first calculating module, a second calculating module, and a correction module. The image capturing module includes an image sensor for capturing an image of the test chart. The image includes two second circular black spots. The image separating module separates the image, thus obtaining a channel image. The processing module is for binarizing the channel image, thus obtaining a binary image of the channel image. The first calculating module calculates coordinates of the centers of the two second spots of the binary image. The second calculating module calculates a rotated angle of the image. The correction module inputs the rotated angle into the image sensor so that the image sensor corrects the image.

11 Claims, 6 Drawing Sheets

IMAGE CORRECTION DEVICE AND METHOD

BACKGROUND

1. Technical Field

The present disclosure relates to an image correction device and an image correction method.

2. Description of Related Art

A typical camera module includes a lens module and an image sensor. The lens module and the image sensor may not be aligned accurately. Accordingly, in some cases, an image taken by the camera module may be rotated around a center thereof. The rotation may render the test (e.g., the test of resolution) of the camera module inaccurately. In addition, the deviation may deteriorate the imaging quality of the camera module.

Therefore, it is desirable to provide an image correction device and an image correction method, which can overcome the above-mentioned limitations.

DETAILED DESCRIPTION

Figure 1:
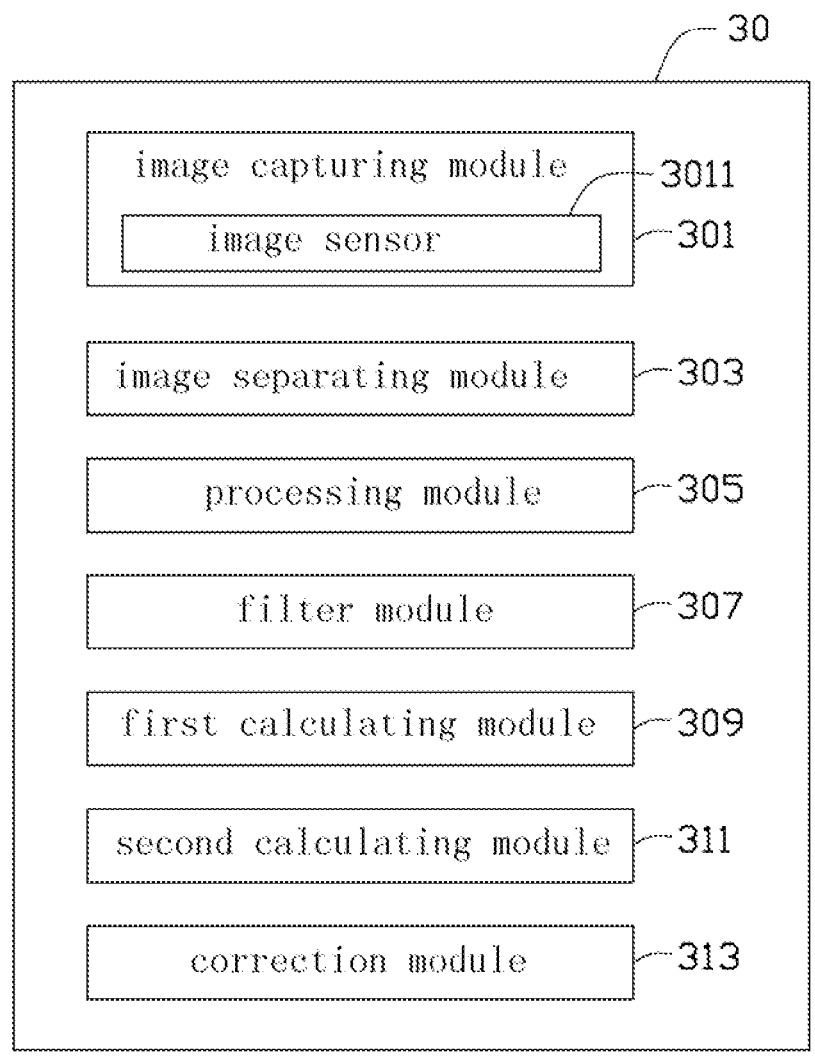
FIG. 1 is a block diagram of an image correction device according to an embodiment.

Referring to FIG. 1, an image correction device 30 according to an exemplary embodiment is shown. The image correction device 30 includes an image capturing module 301, an image separating module 303, a processing module 305, a filter module 307, a first calculating module 309, a second calculating module 311, and a correction module 313.

Figure 2:
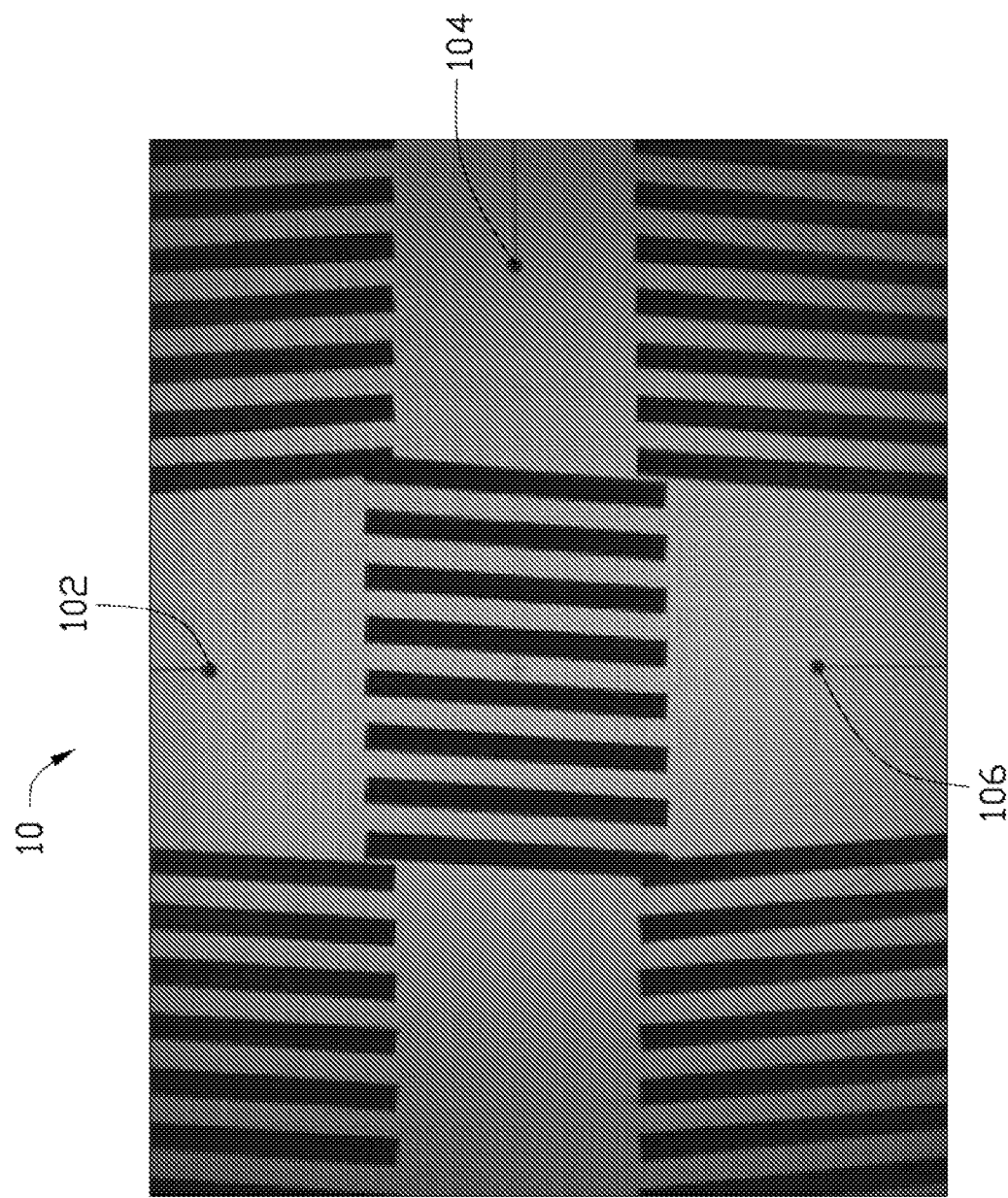
FIG. 2 is a plane view of a test chart according to one embodiment.
Figure 3:
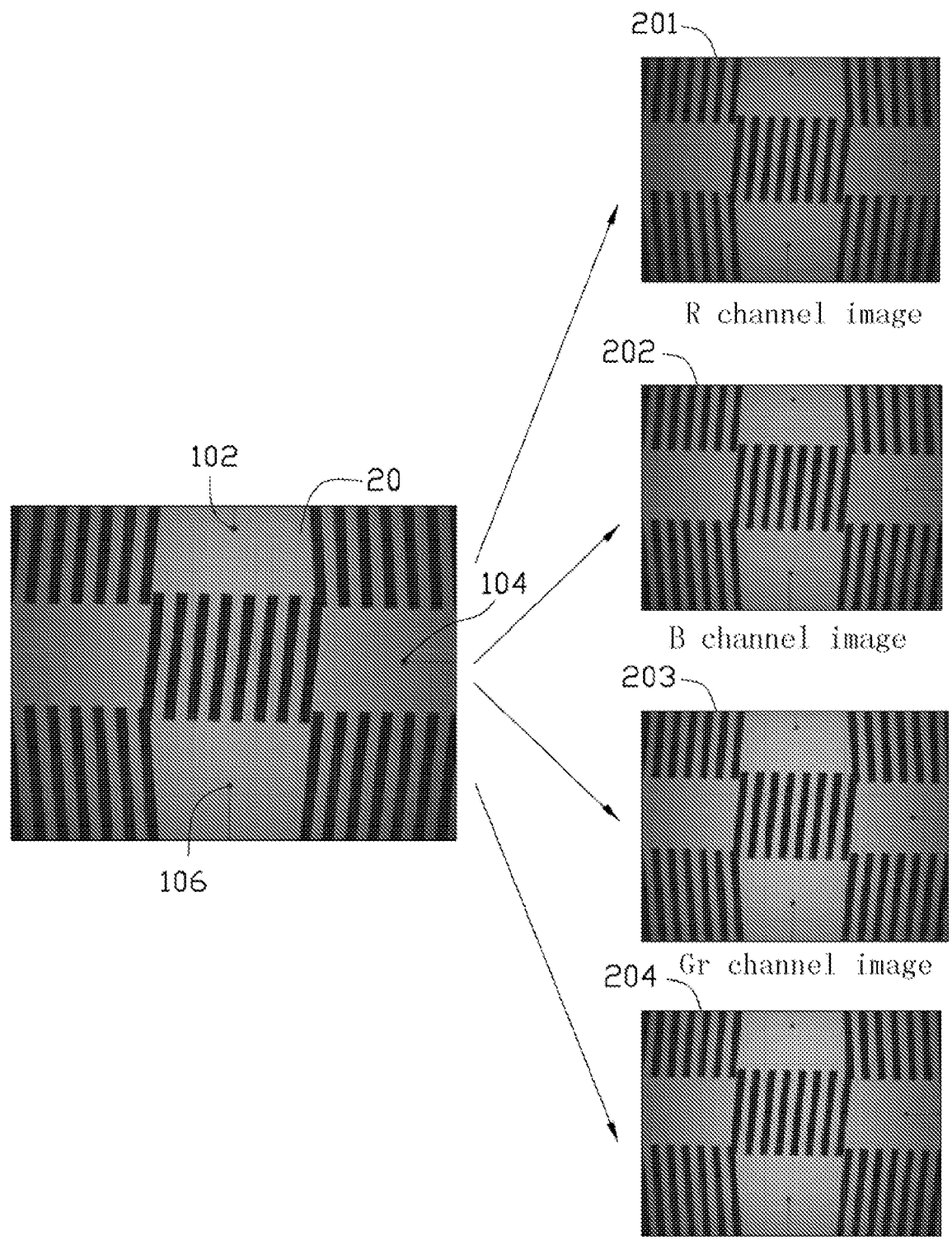
FIG. 3 shows an image of the test chart and four separated channel images, which are divided from the image according to different color channels.

The image capturing module 301 includes an image sensor 3011 with a center. The image capturing module 301 is configured (i.e., structured and arranged) for capturing an image 20 of a test chart 10, as seen in FIGS. 2-3. In the present embodiment, the Image capturing module 301 is a video graphics array (VGA) camera module.

In the present embodiment, the test chart 10 is a substantially rectangular monochromatic picture. The test chart 10 includes one group of black stripes positioned in the middle, four groups of black stripes respectively positioned in four corners, and three black circular spots 102, 104, and 106. The spot 102 is positioned at the top portion of the test chart 10, the spot 106 is positioned at the bottom portion of the test chart 10, and the spot 104 is positioned at the right portion of the test chart 10. An imaginary straight line connecting the spots 102 and 106 passes through the center of the test chart 10, and is substantially perpendicular to the length of the test chart 10. Each group of black stripes includes six equidistant parallel black stripes. Each black stripe is substantially a parallelogram.

In the present embodiment, the size of the image 20 is 648 by 488 (648×488) pixels. The image 20 includes the three spots 102, 104, and 106, the group of black stripes positioned in the middle, and the four groups of black stripes respectively positioned in four corners.

The image separating module 303 is configured for separating the image 20 according to different color channels, thus obtaining a Gr channel image 203.

In the present embodiment, referring to FIG. 3, the image 20 is divided based on four different color channels, i.e., a red channel (R channel), a blue channel (B channel), a green-red channel (Gr channel), and a green-blue channel (Gb channel). Thus, an R channel image 201, a B channel image 202, a Gr channel image 203, and a Gb channel image 204 are obtained. The size of each of the images 201-204 is 324 by 244 (324× 244) pixels.

Figure 4:
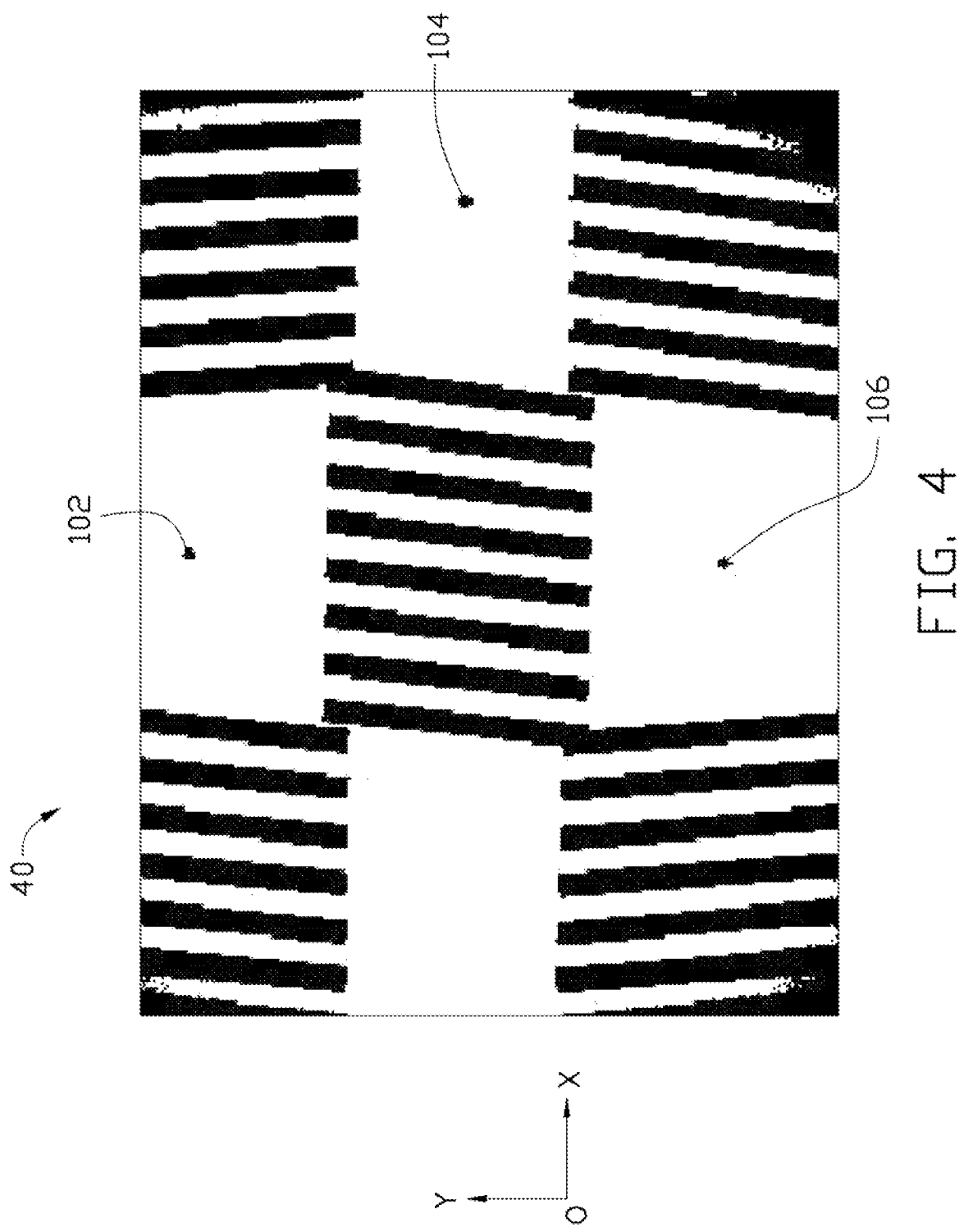
FIG. 4 is a binary image of the Gr channel image of FIG. 3.

The processing module 305 is for binarizing the Gr channel image 203, thus obtaining a binary image 40 of the Gr channel image 203, as seen in FIG. 4. In more detail, first, a brightness threshold is set, for example, 100. Then each pixel of the Gr channel image 203, whose actual brightness is larger than the brightness threshold, is designated a user-defined brightness of 255. Similarly, each pixel of the Gr channel image 203, whose actual brightness is less than the brightness threshold, is designated a user-defined brightness of 0. In this way, a binary image 40 is obtained.

The filter module 307 is configured for filtering out the black stripes, thus obtaining a filtered image 50 (see FIG. 5) with the three spots 102, 104, and 106 remaining. The filter module 307 can set a threshold of length-to-width ratio of a pattern, for example, 1. Referring to FIG. 4, the length-to-width ratio of a pattern equals to a ratio of a length of the pattern along the Y-coordinate to a width of the pattern along the X-coordinate. The filter module 307 filters out patterns with a length-to-width ratio less than or larger than the threshold, and patterns with a length-to-width ratio equal to the threshold remain.

The first calculating module 309 is configured for calculating coordinates of the centers (X1, Y1), (X2, Y2) of the spots 102 and 106.

The second calculating module 311 is adapted to calculating a rotated angle θ of the image 20 relative to an orientation of the test chart 10 based on the centers (X1, Y1), (X2, Y2) of the spots 102 and 106, wherein θ=arctan((X1-X2)/(Y1-Y2)).

The correction module 313 inputs the rotated angle θ into the image sensor 3011 by an inter-integrated circuit (I2C). The image sensor 3011 corrects (i.e., counterrotates) the image 20 according to the rotated angle θ.

Figure 6:
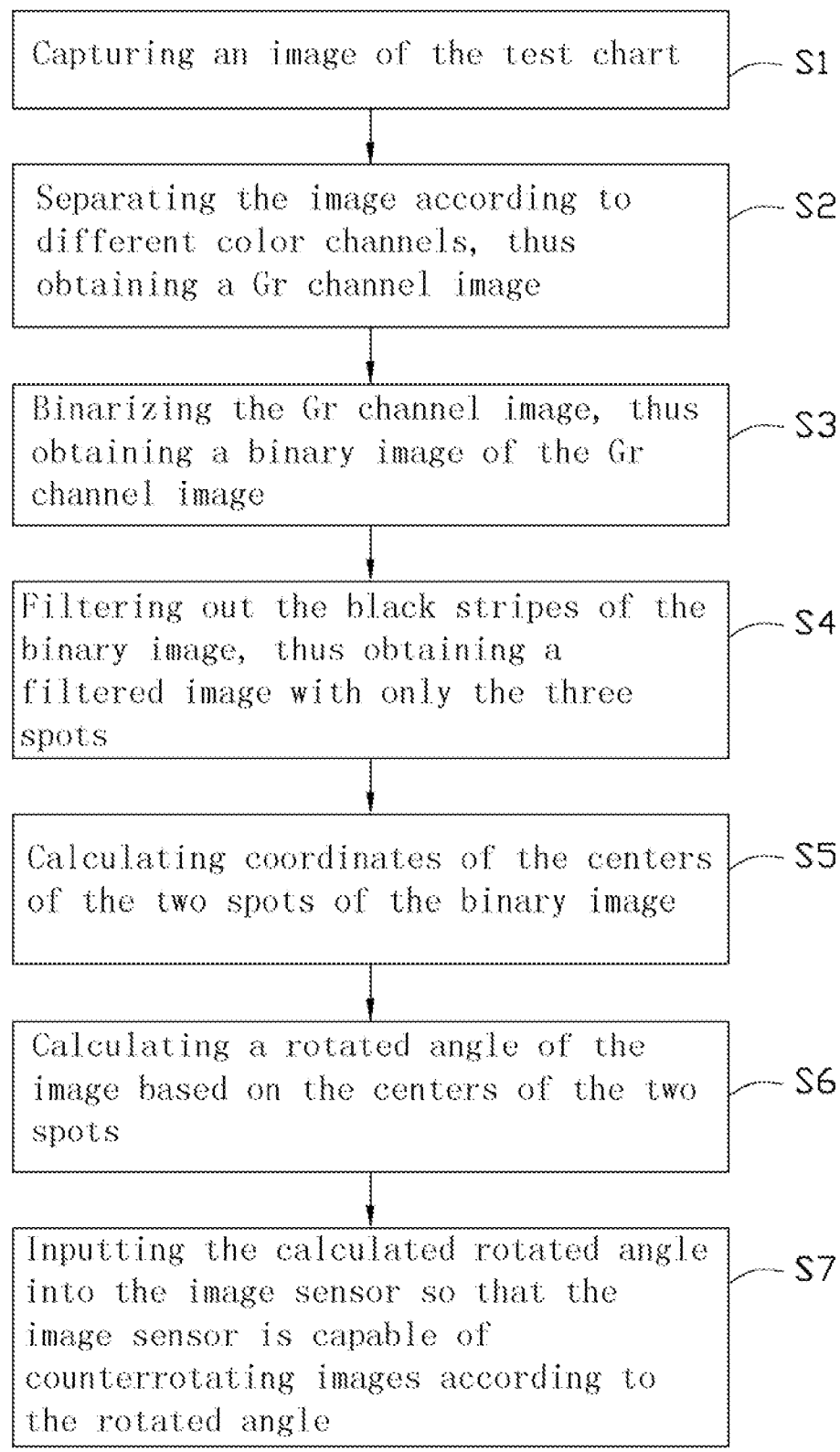
FIG. 6 is a flow chart of an image correction method according to an embodiment.

Referring to FIG. 6, a method for correcting images using the image correction device 30 according to one embodiment will be described as follows.

In step S1, the image 20 of the test chart 10 is captured using the image capturing module 301.

In step S2, the image 20 is separated according to different color channels, thus obtaining a Gr channel image 203.

In step S3, the Gr channel image 203 is binarized, thus obtaining a binary image 40 of the Gr channel image 203, as seen in FIG. 4.

Figure 5:
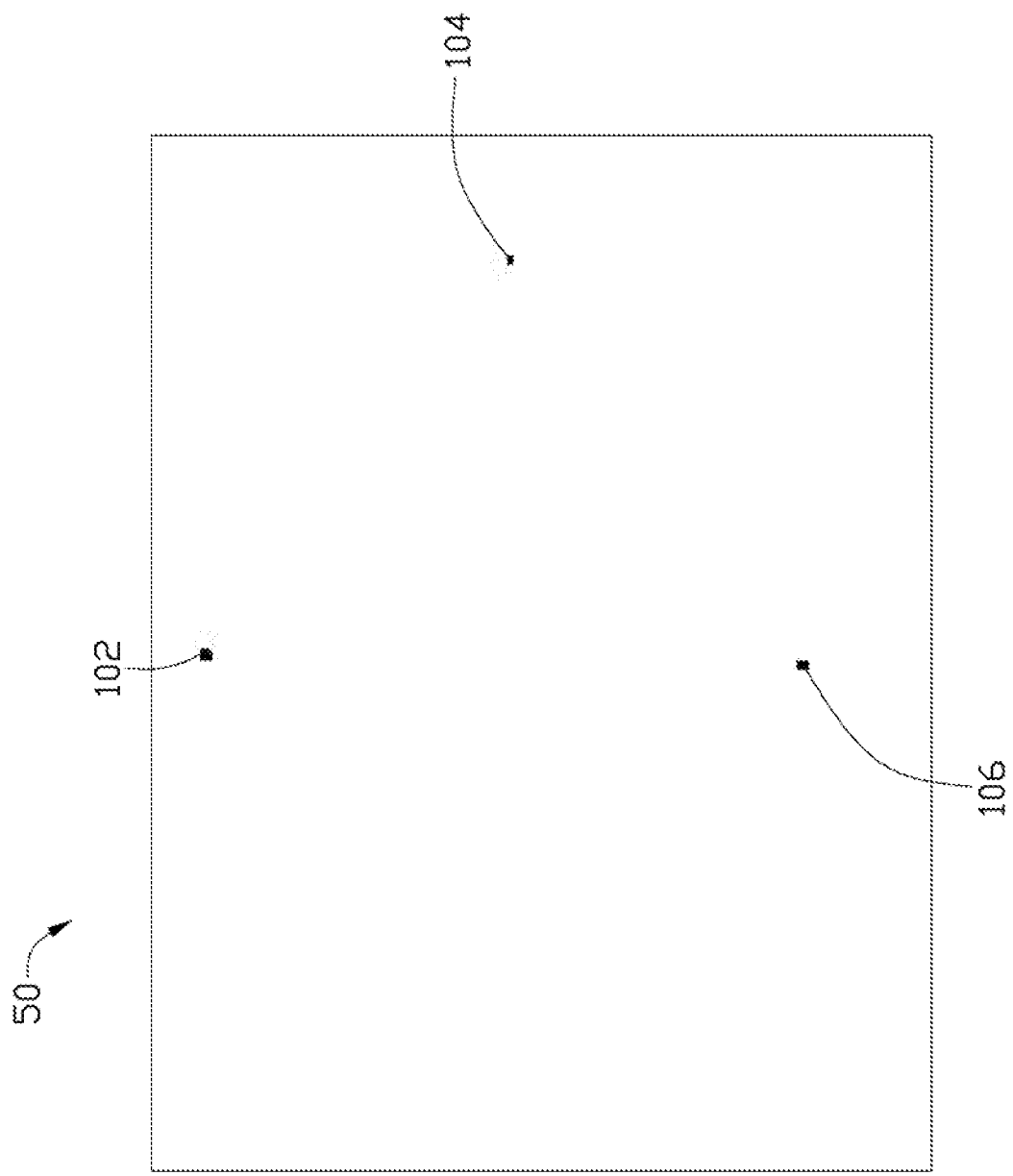
FIG. 5 is a filtered image of the binary image of FIG. 4.

In step S4, the black stripes of the binary image 40 are removed, remaining the three spots 102, 104, and 106, thus obtaining a filtered image 50 (see FIG. 5).

In step S5, the coordinates of the centers (X1,Y1), (X2,Y2) of the spots 102, 106 are calculated.

In step S6, a rotated angle θ of the image 20 relative to an orientation of the test chart 10 is calculated based on the centers (X1, Y1), (X2, Y2) of the spots 102, and 106.

In step S7, the rotated angle θ is input into the image sensor 3011 by an inter-integrated circuit (I2C), and then the image 20 is corrected (i.e., counterrotated) according to the rotated angle θ.

In the present embodiment, the above method is conducted using the Gr channel image 203 because the Gr channel image 203 has the highest contrast of the four channel images. In alternative embodiments, the method may be conducted based on other channel images, e.g., the R channel image.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. An image correction device, comprising:
    a test chart comprising two first circular black spots, an imaginary straight line connecting centers of the two first spots passing through a center of the test chart;
    an image capturing module comprising an image sensor, the image capturing module being configured for capturing an image of the test chart, the image comprising two second circular black spots, the second spots being images of the respective first spots;
    an image separating module configured for separating the image according to different color channels, thus obtaining a channel image;
    a processing module being for binarizing the channel image, thus obtaining a binary image of the channel image;
    a first calculating module configured for calculating coordinates of the centers of the two second spots of the binary image;
    a second calculating module configured for calculating a rotated angle of the image relative to an orientation of the test chart based on the centers of the two second spots; and
    a correction module for inputting the calculated rotated angle into the image sensor so that the image sensor is capable of counterrotating images according to the rotated angle.

2. The image correction device of claim 1, further comprising a filter module configured for filtering out any unwanted pattern of the binary image, thereby obtaining a filtered image with only the second spots.

3. The image correction device of claim 1, wherein the image separating module is configured for separating the image into at least one of a red channel image, a blue channel image, a green-red channel image, and a green-blue channel image.

4. The image correction device of claim 1, wherein the test chart further comprises a plurality of black stripes, the image further comprises the black stripes, the image correction device further comprises a filter module, and the filter module is configured for removing the black stripes.

5. The image correction device of claim 1, wherein the test chart is substantially rectangular, and the straight line is substantially perpendicular to a long side of the test chart.

6. An image correction method comprising:
    (1) providing a test chart, the test chart comprising two first black circular spots, an imaginary straight line connecting centers of the two first spots passing through a center of the test chart;
    (2) capturing an image of the test chart, the image comprising two second circular black spots, the two second spots being images of the two first spots;
    (3) separating the image according to different color channels, thus obtaining a channel image;
    (4) binarizing the channel image, thus obtaining a binary image of the channel image;
    (5) calculating coordinates of the centers of the two second spots of the binary image;
    (6) calculating a rotated angle of the image relative to an orientation of the test chart based on the centers of the two second spots; and
    (7) inputting the calculated rotated angle into the image sensor so that the image sensor is capable of counterrotating images according to the rotated angle.

7. The method of claim 6, wherein in step (3), the image is separated into at least one of a red channel image, a blue channel image, a green-red channel image, and a green-blue channel image.

8. The method of claim 6, further comprising a step of filtering out any unwanted patterns from the binary image thereby obtaining a filtered image with only the second spots after step (4) and prior to step (5).

9. The method of claim 6, wherein the test chart further comprises a plurality of black stripes, the image further comprises the black stripes, and the method further comprises a step of removing the black stripes.

10. The method of claim 6, wherein the coordinates of the centers of the two second spots are represented by $(X1, Y1)$, $(X2, Y2)$, the rotated angle is represented angle by θ and is calculated according to the following equation:

$$\theta = \arctan((X1-X2)/(Y1-Y2)).$$

11. The method of claim 6, wherein the test chart is substantially rectangular, and the straight line is substantially perpendicular to a long side of the test chart.

* * * * *